Feb. 12, 1929.
A. L. CHAPUIS
1,701,492
CAMERA
Filed Aug. 17, 1926     2 Sheets-Sheet 1
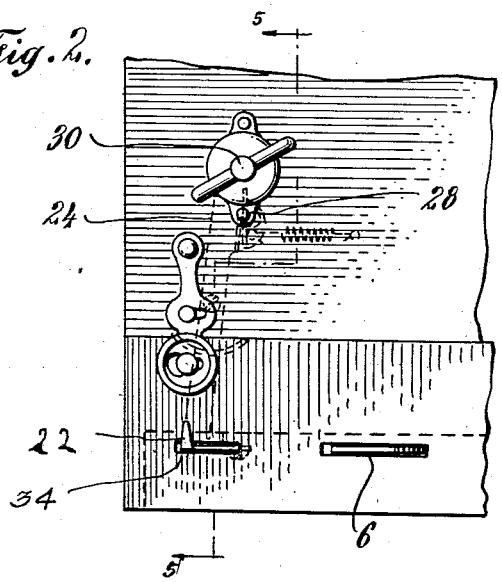
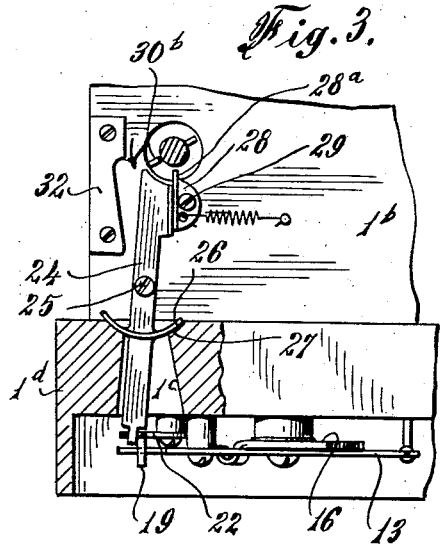
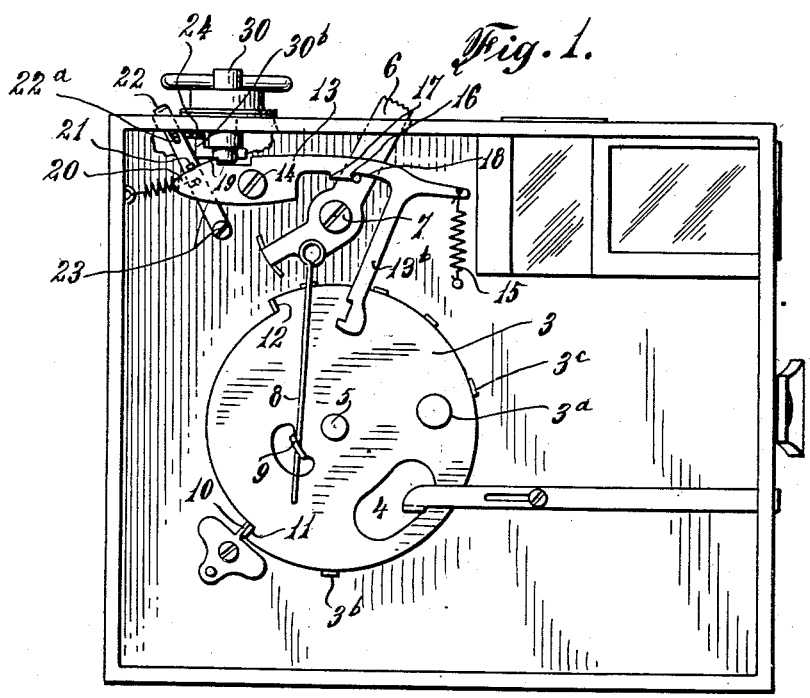
INVENTOR
A. L. Chapuis
BY T. F. Bourne
ATTORNEY Feb. 12, 1929.
A. L. CHAPUIS
1,701,492
CAMERA
Filed Aug. 17, 1926    2 Sheets-Sheet 2

INVENTOR
A. L. Chapuis
BY T. F. Bourne
ATTORNEY

Patented Feb. 12, 1929.

1,701,492

UNITED STATES PATENT OFFICE.

ACHILLE L. CHAPUIS, OF NEW YORK, N. Y.

CAMERA.

Application filed August 17, 1926. Serial No. 129,716.

The object of my invention is to provide simple and inexpensive means to prevent double exposures of the films or sensitive surfaces in cameras, so that when an exposure has been made a second exposure on the same sensitive surface cannot be made until the film has been wound.

My invention comprises novel details of improvement that will be more fully hereinafter set forth and then pointed out in the claims.

Reference is to be had to the accompanying drawings forming a part hereof, wherein Fig. 1 is a face view of a portion of a camera embodying my invention;

Fig. 2 is a plan view;

Fig. 3 is a partly sectional plan view with parts omitted;

Figure 4:
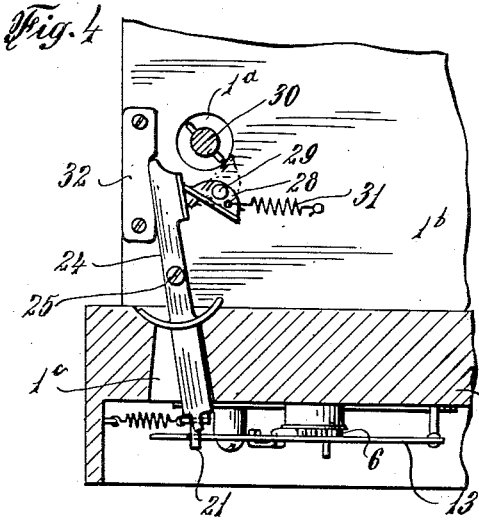
Fig. 4 is a similar view with parts in a different position.
Figure 5:
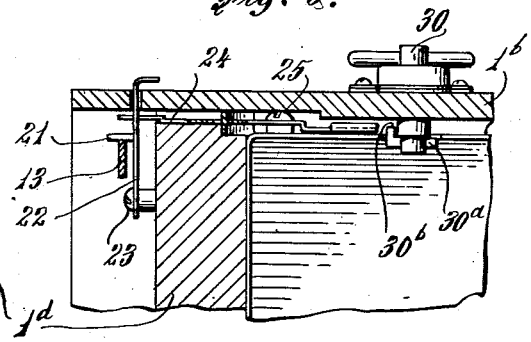
Fig. 5 is a section on line 5, 5, in Fig. 2.

Similar numerals of reference indicate corresponding parts in the several views.
I have illustrated my improvements in connection with an ordinary type of box camera, 1 indicating the camera box having lens 2 and an oscillatory shutter at 3 provided with the usual aperture 4. The shutter is pivoted at 5 on the box. At 6 is a usual shutter controller or finger piece pivoted at 7 and provided with spring 8 engaging the shutter at 9 for operating it in conjunction with stop 10 on the box and stops 11 and 12 on the shutter, in a usual way. A controlling member or lever 13 for the finger piece is pivoted on the box at 14 and normally drawn by spring 15 connected with said member and with the box. The member 13 has spaced stops 16 and 17 adapted to cooperate with a projection or pin 18 on controller or finger piece 6 to retain the latter locked, either to the right or the left in the drawing, to prevent operation of the controller unless the film has been properly wound. The member 13 has an abutment 19 and an adjacent inclined surface 20 leading thereto for cooperation with a pin or projection 21 on an arm 22 pivoted on the box at 23. In Fig. 1 the parts are shown in a locked position and in Fig. 6 in the released position for operation of the finger piece and the shutter.

Figure 8:
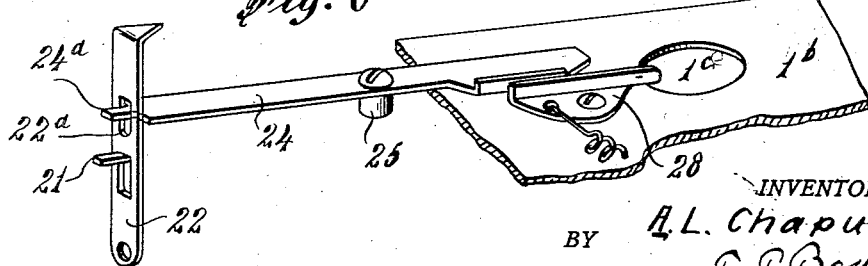
Fig. 8 is a detail perspective view.

The arm 22 is operative by means of a lever 24, pivoted at 25 on top 1ᵇ of the box, the lever having a reduced end 24ᵃ located in a hole 22ᵃ in arm 22, (Fig. 8), for operating the latter. The outer end of lever 24 operates in a recess 1ᶜ in the front wall 1ᵈ of the box and said lever is shown provided with a curved shield 26 that operates against a curved surface 27 on wall 1ᵈ to exclude light from the camera, (Fig. 3).

A dog 28 is pivoted on the top 1ᵇ at 29 and normally spring pressed toward lever 24 in position to be operated by the film winder or spindle 30, journaled on the camera top in a usual way, to actuate the lever. Spring 31 connecting dog 28 with the camera top normally retains the dog in the position shown in Fig. 3 respecting lever 24. The film winder has the usual wing 30ᵃ for operating the spool of the film and in addition is provided with a projection 30ᵇ adapted to engage the free end 28ᵃ of dog 28 when rotated to wind the film, the end 28ᵃ of the dog projecting into the opening 1ᵉ in the camera top in which the film winder rotates. When the film winder is rotated in the direction of the arrow in Fig. 3 its projection 30ᵇ will tilt dog 28, (as dotted in Fig. 4), to shift lever 34 from the position shown in Fig. 3 to the position shown in Fig. 4, to cause projection 21 to engage abutment 19. When the film winder releases the dog 28 the latter will be shifted by spring 31 out of the path of opening 1ᵉ and will rest against lever 24, as in full lines in Fig. 4, until said lever returns to the normal position shown in Fig. 3, the lever and dog assuming the position shown in said figure. A stop 32 on the camera top may be engaged by lever 24 so that dog 28 will not rotate too far, (Fig. 4).

Figure 6:
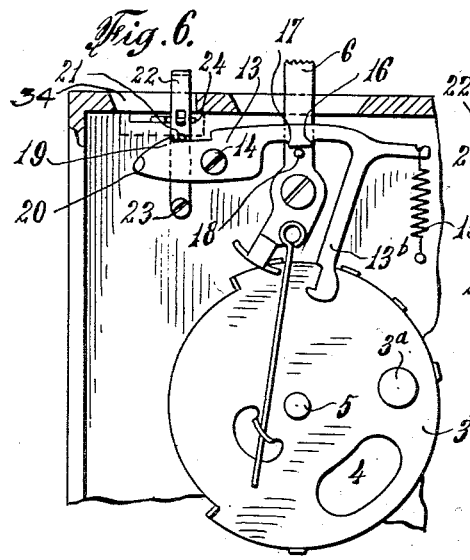
Fig. 6 is a partly sectional front view with parts in an operating position for a snap shot;
Figure 7:
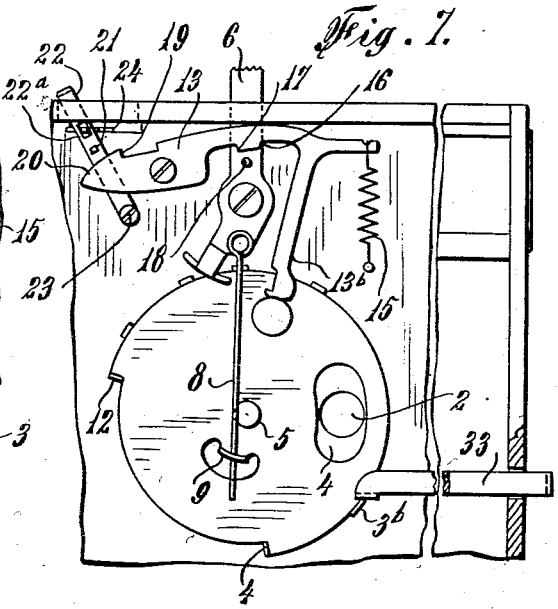
Fig. 7 is a similar view showing the parts in position for a time exposure.

The member 13 is provided with a projection 13ᵇ that is adapted to be engaged by a lug or projection 3ᵃ on shutter 3, which may be stamped from said shutter, whereby when said lug engages projection 13ᵇ the member 13 will be tilted to release its abutment 19 from pin 21, (Fig. 6), as during rotation of the shutter for a snap shot, and when the shutter is retained in a time exposure position, as in Fig. 7, the lug 3ª will rest against the projection 13ᵇ to keep the pin 18 out of cooperation with member 13 and release pin 21 from abutment 19.

When the parts are in the position shown in Fig. 1 the finger piece 6 will be locked from operation and will only be released when the film winder is rotated to wind a film, whereupon the dog 28 will tilt lever 24, thereby causing arm 22 to be shifted so that its projection 21 will slide on surface 20 and engage the abutment 19 of member 13, thereby tilting the member to release the stop 16 from pin 18, as in Fig. 6. In such position of the parts piece 6 may be shifted to the left in Fig. 6, whereupon the shutter will operate for a snap shot. The pin 18 of finger piece 6 then will rest against the stop 17 and upon the next rotation of the film winder pin 21 will ride up the inclined surface 20 and stop behind the abutment 19 to retain member 13 and free the pin 18 from stop 17 so that finger piece 6 may be shifted to the right for reversely shifting the shutter. Each time the shutter has been operated the member 13 will be pulled by spring 15 to cause one of its stops 16 or 17 to engage the pin 18 of the finger piece to prevent operation of the finger piece until the spool winder has been rotated to wind the spool and to cause the pin 21 to ride up on inclined surface 20 of member 13 to engage abutment 19 and retain one of the stops 16 or 17 out of cooperation with pin 18. In case a time exposure is to be made the slide piece 33 will be pulled out in a usual way to engage one of the stops 3ᵇ or 3ᶜ of the shutter to retain the latter for time exposure with the finger piece 6 free from member 13 because the latter then will be retained by lug 3ª in engagement with projection 13ᵇ so that pin 18 is free from the stops of member 13, as in Fig. 7.

By means of my improvements assurance is had that but one exposure will be made on the same sensitive surface of a film because after the finger piece has been operated for an exposure it cannot again be operated until the film winder has been rotated to wind the film and cause release of member 13 from the projection 18.

The arm 22 is shown projecting through a slot 34 in the top of the front portion of the box in position to be observed. When arm 22 is at the left it indicates that controller 6 is locked, (Figs. 1 and 2), and when the arm 22 is at the right hand side of the slot, (Fig. 6), it indicates that the controller is unlocked for operation.

Having now described my invention what I claim is:—

1. A camera comprising a shutter, a controller to operate the same, a movable member, means cooperative between the member and the controller to restrain the latter, a film winder, and means operative by the film winder to release the said member from the controller to permit operation of the shutter, the movable member being provided with a projection and the shutter having a lug to engage the same to release the member from the controller to permit operation of the latter for time exposure.

2. A camera comprising a shutter, a controller to operate the same, a movable member, means cooperative between the member and the controller to restrain the latter, the member having an abutment, a projection to engage the abutment to retain the member released from the controller, a film winder, and means operative by said winder to operate said projection to actuate the member to release the latter from the controller and engage the abutment with the projection to retain the member released from the controller.

3. A camera comprising a shutter, a controller to operate the same, a movable member, means cooperative between the member and the controller to restrain the latter, the member having an abutment and an adjacent inclined portion, a projection to engage said inclined portion and said abutment, an arm to operate said projection, a film winder, and means operative by said winder to actuate said arm to cause the member to release the controller.

4. A camera as set forth in claim 3, in which the means to actuate the arm includes a movable dog in position to be operated by the film winder to actuate the arm.

5. A camera comprising a shutter, a controller to operate the same, a movable member having spaced stops, the controller having a projection to engage said stops to retain the controller in different positions, a film winder, and means operative by the film winder to actuate said member to release either of its stops from said projection to permit operation of the controller.

6. A camera as set forth in claim 5, in which the shutter and the member have cooperative means to actuate the latter to position it to restrain the controller.

7. A camera comprising a shutter, a controller to operate the same, a movable member having spaced stops, the controller having a projection to engage said stops to retain the controller in different positions, a film winder, the member having an abutment and an operating surface, a projection to engage said surface to actuate the member for engagement of its abutment with said projection, and means operative by the winder to actuate the projection including an arm carrying the projection and a lever cooperative with the arm and operative by the winder.

8. A camera comprising a shutter, a controller to operate the same, a movable member having spaced stops, the controller having a projection to engage said stops to retain the controller in different positions, a film winder, the member having an abutment and an operating surface, a projection to engage said surface to actuate the member for engagement of its abutment with said projection, means operative by the winder to actuate the projection, including an arm carrying the projection, a lever cooperative with the arm, and a spring actuated dog operative by the winder to actuate the lever.

ACHILLE L. CHAPUIS.